United States Patent

Neher et al.

Patent Number: 6,040,567
Date of Patent: Mar. 21, 2000

[54] METHOD AND DEVICE FOR CONTROLLING FAST PERIODIC MOTION

[75] Inventors: Erwin Neher; Frank Würriehausen, both of Bovenden, Germany

[73] Assignee: Max-Planck-Gesellschaft zur Forderung der Wissenschaften e.V., Munich, Germany

[21] Appl. No.: 09/042,343

[22] Filed: Mar. 13, 1998

[30] Foreign Application Priority Data

Mar. 14, 1997 [DE] Germany .................. 197 10 714

[51] Int. Cl.[7] .................................................. H01J 40/14
[52] U.S. Cl. ..................................... 250/206; 250/221
[58] Field of Search ................................. 250/206, 221, 250/559.32, 559.38, 214 R

[56] References Cited

U.S. PATENT DOCUMENTS

| | | | |
|---|---|---|---|
| 3,919,546 | 11/1975 | Lutus | 250/205 |
| 4,155,620 | 5/1979 | Rawson | 359/215 |
| 4,638,156 | 1/1987 | Horikawa et al. | 250/235 |
| 4,648,685 | 3/1987 | Fukai et al. | 359/214 |
| 4,984,857 | 1/1991 | Yeung et al. | 359/213 |
| 5,557,156 | 9/1996 | Elings | 250/306 |

FOREIGN PATENT DOCUMENTS

291217A5 6/1991 Germany .
4322694A1 1/1994 Germany .

*Primary Examiner*—Que T. Le
*Attorney, Agent, or Firm*—Duane, Morris & Heckscher LLP

[57] ABSTRACT

A method for moving an object such that a location coordinate of the object is adapted at least in one periodic sub-interval to a aim function $y<<(t)$ comprises parameterizing the aim function as a series expansion in accordance with

$$y'(t) = \sum_{i}^{\infty} a'_i \cdot A_i(t),$$

determining n command parameters $a_1, a_2, \ldots a_n$, for which an optimization criterion is satisfied in the periodic sub-interval for a command function $$y(t) = \sum_{i}^{\infty} a_i \cdot A_i(t),$$

and signalling the object such that the location coordinate thereof corresponds to the command function. In a closed loop method for setting a controlled variable for a driver function of an engine with amplitude attenuating and phase delay the driver function is formed with amplitude/phase compensation parameters.

14 Claims, 5 Drawing Sheets

METHOD AND DEVICE FOR CONTROLLING FAST PERIODIC MOTION

BACKGROUND OF THE INVENTION

1. Field of the Invention

The invention relates to a method for moving or driving an object, more particularly for controlling periodic motion of a reflector element such as e.g. a galvanometer mirror for incremental or "raster"-type deflection of a laser scanning beam, and to devices for implementing the methods.

2. Description of the Prior Art

In measuring and experimenting systems there is often the requirement to raster-scan a system being investigated (sample) as regards a specific quantity to be measured. In a microscope, for instance, a sample is to be scanned by a light signal by means of a movable deflection mirror. The deflection of the deflection mirror is required to obey a specific time pattern to which data acquisition is adapted. Another example is the scanning motion of field-forming elements (e.g. grids) for local resolving electron-spectroscopic analyzers.

The problems associated with signal control in generating scanning motion will now be discussed by way of a deflection mirror of a confocal laser fluorescence scanning microscope (abbreviated LSM) as an example.

For LSM line scanning the laser beam needs to be steered over an object at an angle interval line-by-line in a time profile as linear as possible. This is done as a rule by galvanometer mirrors which are subjected to a driver signal of the desired scan angle time profile.

Usally, for this purpose feedback galvanometer mirrors having an angle sensor (see E. H. K. Stelter in "Handbook of Biological Confocal Microscopy", Plenum Press, New York 1995, pages 139–154) are used. In a feedback circuit having analog amplification the sensor signal is compared to a command signal (reference variable input). Using a correspondingly generated positioning signal the mirror is subjected to the desired deflection. The command signal may be, for example a linear function. However, due to the roughly 0.5 to 2 ms transient phase of the mirrors in abrupt deflection scanning rates of only approximately 500 Hz are achieved, representing a limitation in real-time analysis.

To achieve higher scanning rates the mirrors are operated freely oscillating with no feedback for a predetermined frequency (for example for a resonant frequency) of the mirror. In this case deflecting the mirror is substantially sinusoidal. Data acquisition (width of the sensing intervals) is accordingly irregular which is a drawback in interpreting the data. This is why for data acquisition use is often made of only a small deflection range about zero where the sine function is more or less linear. This, however, has the drawback that only a fraction (e.g. 30%) of the working cycle of a full deflection period is available for data acquisition. In addition, complicated means of correction may be necessary after data acquisition to linearize the acquired image (see Tsien et al. in "Handbook of Biological Confocal Microscopy", Plenum Press, New York 1995, pages 459–478). Freely oscillating mirrors have further the disadvantage of low long-term stability. In addition to the cited problems it is a drawback of the resonance systems that operation is tied to a fixed resonant frequency which as a mechanical parameter cannot be varied and which may result in undesirable beat frequencies when superimposed by other resonant frequencies of the system.

Another problem associated with LSM mirror control is achieving sufficient phase stability when changing the direction of the motion, this being the reason why in conventional LSM in avoiding a dislocation between subsequently scanning lines half of the working cycles are dumped and only the scan for mirror motion in a predetermined direction made use of in each case for data acquisition.

Thus, the problem quite generally in LSM systems is that where mirror control involves feedback with a linear command function the operating frequency is limited and where done without feedback, although higher frequencies can be attained, this is only possible with reduced stability and at the expense of more time and processing being needed. This problem illustrated by way of LSM systems occurs in all applications in which fast periodic motion of an object having an inert mass needs to be moved in keeping with a command function. This relates to e.g. scanning reflectors moved in general, e.g. as in laser printers or in laser show systems, but also to moved scanning signal sources or the like.

It is generally appreciated that frequency-dependent amplitude and phase errors may occur in closed loops having analog amplification, this usually being counteracted by increasing the amplification factor. However, this is possible only to a limited extent since self-excited oscillations may occur in the control circuit or the amplifier may be driven into a non-linear operating range. In both cases prohibitive disturbances materialize for the controlled periodic motion, e.g. of reflector elements, due to undesirable frequency components, this in turn resulting in a restriction to low operating frequencies.

SUMMARY OF THE INVENTION

An object of the invention is to define an improved method of moving an object, more particularly for controlling periodic motion of a reflector element, which obviates the limitations of conventional procedures and more particularly enables enhanced motion frequency, accuracy, long-term stability and phase stability to be achieved. It is furthermore an object of the invention to define an improved method of establishing an optimum command function for controlling motion of an object. It is also an object of the invention to provide devices for implementing the methods.

In accordance with a first aspect the invention is based on the idea of moving an object so that a location coordinate of the object changes in response to a command function resulting from an aim function (or: objective function, destination function) by parameterization with aim parameters by means of series expansion and subsequent optimization of the aim parameters in forming a command function having a finite number of command parameters.

The aim function corresponds to the motion sequence which the object is required to obey ideally but which it is unable to do so in all phases of the working cycle (motion cycle) due to its mass inertia. The aim function may be, for example, a linear delta function or a linear ramp function. The series expansion is preferably a Fourier series expansion comprising only a finite number of terms capable of making a contribution in frequency in the real inert system.

Forming the command function is done by changing the aim parameters (for example Fourier coefficients) into command parameters such that in a periodic sub-interval of the working cycle a specific optimization criterion is satisfied.

The optimization criterion may be dictated, for example, by the command function being adapted in the cycle's sub-interval (or: periodic sub-interval) maximally to the aim function or by the acceleration of the object (where necessary taking into account further boundary conditions) being a minimum. The inventors have discovered that although in the transition from an infinite number of aim parameters to a finite number of optimized command parameters a difference occurs in observing the total cycle between the command function and the aim function, this is shifted substantially, however, to marginal portions of each half-cycle, whereas in a cycle's sub-interval separated by the marginal portions from the reversing points of the periodic motion the command function having a finite, optimized number of parameters is substantially better adapted to the aim function than a Fourier series expansion of a ramp function.

If the object is to be moved or driven at a specific fundamental frequency the number n of the frequency components (harmonics) to be taken into account and thus the command parameter is selected as a function of the frequency response or characteristic of the object concerned. This selection is done preferably such that for n times the value of the fundamental frequency the frequency response is greater than zero and lies above a specific limit. This limit may correspond for example to a specific damping (e.g. factor 1/100) for high frequencies relative to the undamped frequency response at low frequencies.

The motion sequence in accordance with the invention may be dictated for example by a driver signal for a driving means of the object, the driver signal being formed as the setpoint or positioning signal from the command function and the sensor signal. In accordance with one preferred embodiment of the invention the engine is part of a closed loop comprising further means for sensing the motion condition (more particularly the position or deflection) of the object, analog amplifier means and signal shaping means for forming the driver signal.

In accordance with a further aspect a closed loop method for setting a controlled variable in making use of a compensated command function is defined in accordance with the invention. The controlled variable may change periodically as for instance in periodic motion of an object with a fundamental frequency, whereby a location coordinate of the object corresponds to a command function formed by superimposing sinusoidal functions of the fundamental frequency and harmonics thereof, whereby a driving means of the object is controlled in response to a driver function formed by superimposing the sinusoidal functions compensated in amplitude and phase as a function of the frequency. In this arrangement frequency-dependent amplitude or phase compensation parameters sensed from an amplitude/phase frequency characteristic of the engine or in integration in a closed loop by an interative procedure are introduced into the sinusoidal functions.

In the iterative method in accordance with the invention the driving means is repeatedly signalled for a predetermined number of lead cycles corresponding to an estimated driver function according to estimate values programmed for the amplitude/phase compensation parameters, whereby the signal of the scanning motion sensed and averaged in each case over the lead cycles being subjected to a Fourier analysis and the estimate values corrected in keeping with the established Fourier components until the sensor signal substantially corresponds to the command function. In the Fourier analysis one or two cycles (transient phase on commencement of the driver function) remain neglected.

The methods in accordance with the invention are put to use preferably individually or in combination for signalling galvanometer mirrors, for example, in laser scanning microscopes.

Devices in accordance with the invention for implementing the methods in accordance with the invention are formed by a closed loop comprising a driving means for driving the object to be moved, means for sensing the motion condition of the object relative to at least one location (position) coordinate, analog amplifier means for furnishing a sensor signal (or actual signal), feedback amplifier means, storage means and signal shaping means for forming a driver signal in the engine from the actual signal and a command function.

Embodiments and advantages of the invention are described in the following with reference to the annexed FIGS.

BRIEF DESCRIPTION OF THE DRAWINGS

The following is a brief description of the drawings in which.

DETAILED DESCRIPTION

The invention will now be discussed by way of signalling a galvanometer mirror in a LSM as an example. The ideal aim function for deflecting the mirror would be a delta or ramp function (so-called sawtooth function). The advantages of the delta function as compared to the ramp function are as follows: due to the inertia of the mirror and the upper limits of the permissible driver currents the maximum angular acceleration of the mirror is limited, this affecting the ramp function more strongly than the delta function. In addition, in the case of the delta function, both half-cycles of the cycle can be made use of so that higher line frequencies can be anticipated. The following discussion relates to delta functions, whereby solutions materialize correspondingly for ramp functions (see below).

The consideration in the following is a periodic (repetetive) deflection of a galvanometer mirror having a fundamental frequency $f_0$. After an initial transient phase the deflection can be represented to advantage by a Fourier series. Due to the symmetry of the delta function the series terms corresponding to the even number harmonics of the fundamental frequency disappear and the result is a sine series.

$$\left[ y(t) = \sum_{k}^{\infty} a_k \cdot \sin(kf_0 t) \right].$$

A series expansion discontinued after a few terms represents as a rule a good approximation for the expanded function. Since the amplitude/frequency characteristic (so-called transfer function) drops off in any case quickly above a critical cut-off frequency in the case of mirror galvanometer systems it makes sense to restrict the number of frequency components to be taken into account, it having been found out that good linearization results can already be achieved for a cycle sub-interval of 75% of the total cycle when computing with a sum containing only the fundamental and the third harmonic.

Figure 1A:
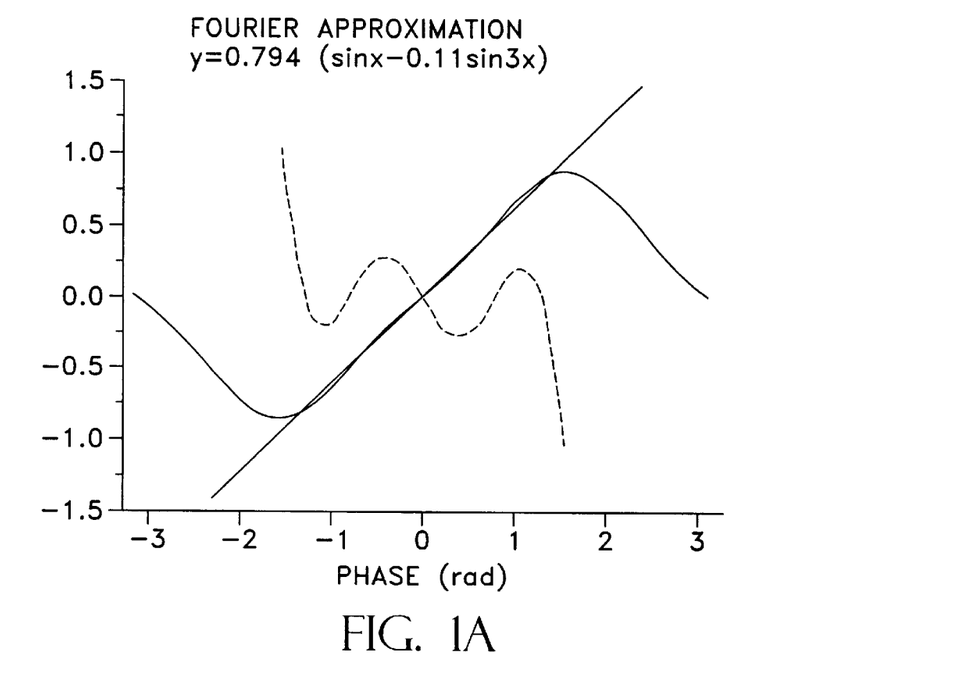
FIG. 1 are plots illustrating formation of a command function in accordance with the invention.

Referring now to FIG. 1A there is illustrated a plot of the linear function $2x/\pi$ (dotted) and the corresponding Fourier expansion (drawn line) in the range $\pm\pi$. The Fourier expansion is discontinued after the summands of the third harmonic. The broken line plot shows a relatively strong departure between the linear function and the Fourier expansion (arbitrary units).

In accordance with the invention the Fourier coefficients (aim parameters) stemming from the expansion as shown in FIG. 1A are changed to obtain a command function having optimized command parameters.

The function $$y = A(\sin x + b \sin 3x) \tag{1}$$

is adapted in the value range $\pm 1, 2$ rad (cycle sub-interval) to the function $2x/\pi$ by varying the free parameters A and b. The optimization criterion is minimization of the square of the departure, a minimum existing at the values A=0.774 and b=−0.073.

Figure 1B:
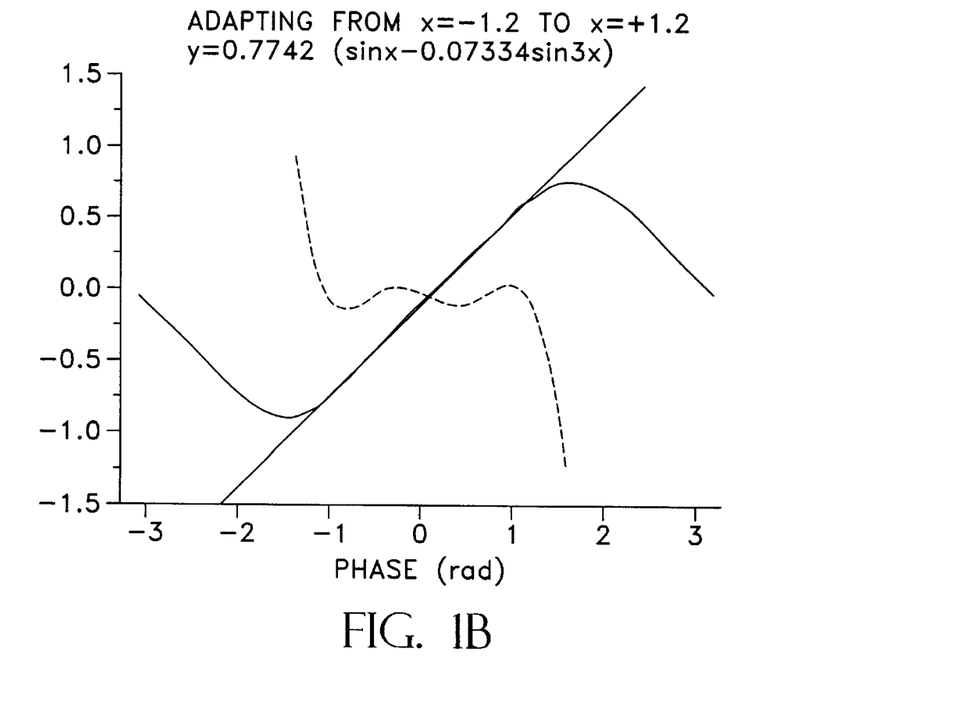

Referring now to FIG. 1B there is shown the result of having optimized the parameters, this indicating less departure (broken line plot) of the command function from the aim function than as shown in FIG. 1A. For a working cycle of 75% of the total cycle a departure of the desired linear profile of less than 1.5% is achievable.

In accordance with the invention the galvanometer mirror is signalled so that its motion sequence obeys the function (1) where y is, for example, an angular coordinate of an axially rotated mirror and $x=f_0 t$.

The number n of the Fourier components entered into the calculation, the parameters A, b, . . . and the width of the cycle sub-interval are to be defined in keeping with the concrete requirements of the measuring system. The number n can be selected, for example, so that higher harmonics (e.g. the 5th harmonic) are taken into account, this making sense only when $f_0$ is smaller than or equal to the cut-off frequency of the mirror system in each case. To attain a further improvement of the command parameters the fundamental frequency $f_0$ of the mirror motion thus needs to be lowered, where necessary. The fundamental frequency (with an increase in n) can be lowered continuously down to frequencies at which conventional mirrors with a strong feedback are operated at which the command function is given by the aim function. This compatibility represents a particular advantage of the motion control in accordance with the invention.

As an alternative a further linearization is also achieved by making the cycle sub-interval smaller (e.g. to values below 75% of the working cycle), it also being possible, however, to increase the periodic sub-interval as long as the maximum permissible angular accelerations as dictated by the system are not exceeded.

An alternative optimization criterion results from defining the linear motion substantially as a motion having no acceleration in the desired cycle or sub-interval. In this case, for example, the second time derivation of the function (1) is to be minimized, whereby boundary conditions may need to be satisfied, where necessary (e.g. excluding zero motion y=0).

To avoid distortion of the command function due to non-linearities of the amplifier when the method is implemented in a closed loop having analog amplification, a restriction of the amplitudes can be entered into the optimization criterion as a boundary condition, the degree to which the amplitude is restricted being selected as a function of the characteristic of the amplifier.

If the aim function is given by a ramp function, establishing the motion sequence in accordance with the invention as described in using three Fourier components results in the function $$y = \sin x - 0.287 \sin 2x + 0.062 \sin 3x \tag{2}$$

where $(x=f_0 t)$ and the parameters being in turn variable depending on the conditions of the measurement and system concerned.

Instead of the Fourier expansion other series expansions can be used, e.g. a power series expansion, however, the Fourier expansion is preferred for periodic motion.

For implementing the method in accordance with the invention in a LSM a closed loop is formed comprising as the driving means for driving the mirror to be moved a galvanometer system having a position or deflection sensor for sensing the motion condition of the mirror, analog amplifier means for furnishing a sensor signal (or actual signal), feedback amplifier means and signal shaping means for forming a driver signal in the galvanometer system from the actual signal and a command function. The command function is made available by a control unit. Establishing the command function is done at least in part program-controlled. The series expansions may also be implemented by correspondingly analog circuits.

Compensating the frequency response by amplitude/phase compensation factors as a function of the frequency will now be described.

Conventional galvanometer systems (galvanometer having a feedback amplifier) have a cut-off frequency of 500 Hz to 1 kHz when the analog electronics are set to an optimum. When the command signal exceeds this frequency the resulting motion is attenuated (attenuation a(f)) and delayed in phase (phase delay $\phi(f)$). The transfer function (amplitude response) may drop totally to zero, for example, at frequencies above 2 kHz, or the phase delay at 1 kHz may amount to 90°. To nevertheless achieve as high a working frequency of the galvanometer system as possible a modified (compensated) command function as given by $$y_{komp} = A \cdot \left( \frac{\sin(f_0 t - \phi(f))}{a(f)} + b \cdot \frac{\sin(3 f_0 t - \phi(3f))}{a(3f)} \right) \tag{3}$$

is programmed in accordance with the invention for a delta signalling arrangement in accordance with the above example embodiment.

The fundamental frequency $f_0$ is selected approximating the cut-off frequency so that an attenuation and delay of both the fundamental wave and the higher harmonics occurs, the latter in keeping with the transfer function to an even stronger degree. The compensation factors a(f) and $\phi(f)$ correspond just to the attenuation and phase delay. This compensation may be restricted, where necessary, to motion sequences having small amplitudes (small deflection, small sample range) to avoid entering into a non-linear range of amplification.

The compensation in accordance with equation (3) can be made more general relative to optional periodic aim and command functions. The essential difference to conventional electronic compensation by increasing the amplification irrespective of the frequency is that the command function is modified such that attenuation and phase delay factors as a function of frequency enter into each summand of the optimized command parameter representation.

The amplitude/phase compensation factors can be determined as follows.

In principle the compensation factors can be determined by separately gauging the galvanometer system in each case (amplitude/frequency and phase delay/frequency dependencies). This is, however, tedious and results only in a restricted accuracy since the dependencies themselves are a function of the amplitude and it is unacceptable in actual practice to store for each and every possible amplitude (deflection, i.e. sample range in the LSM application) the family of curves precisely corresponding thereto. Furthermore, a high phase accuracy is demanded if both half-cycles of the motion sequence are to be made use of in data acquisition. This is why in accordance with the invention an iterative method is proposed which will now be described with reference to FIGS. 2 to 4.

Figure 2:
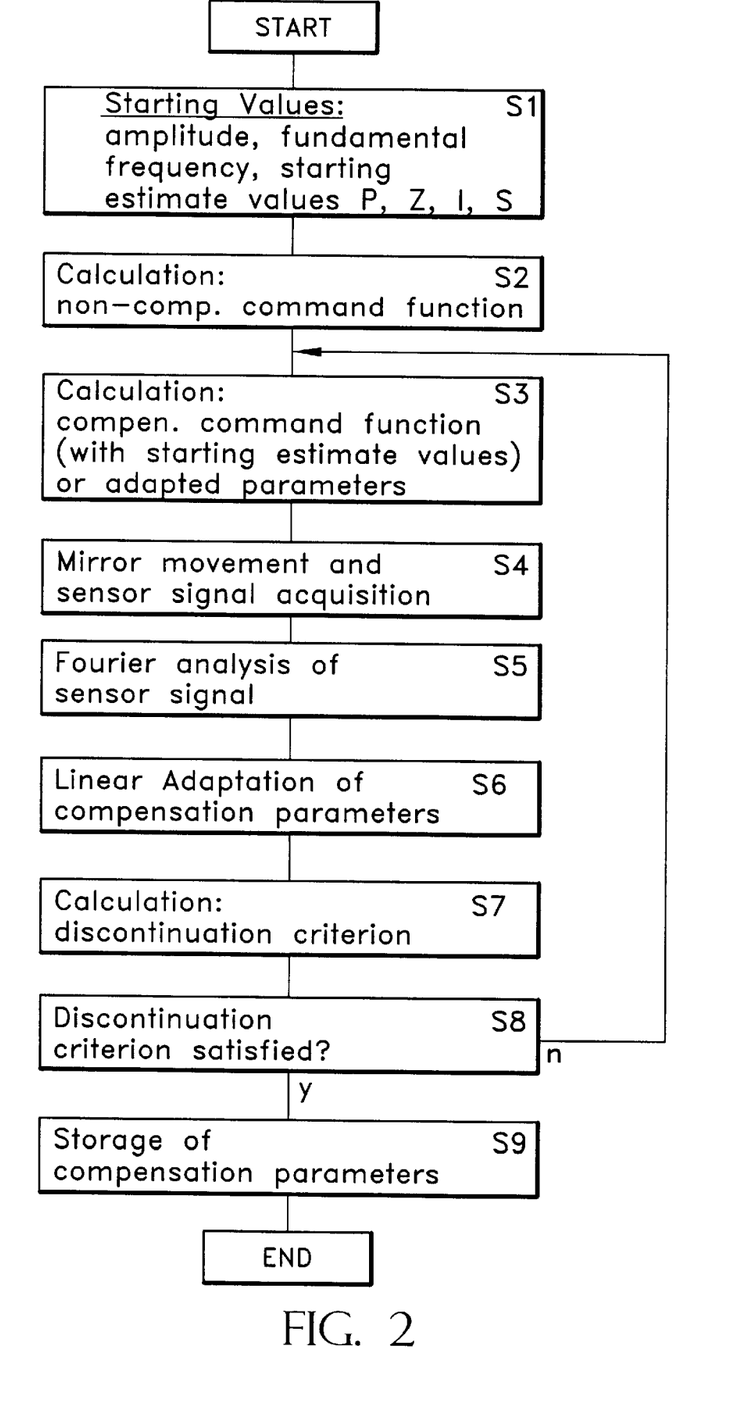
FIG. 2 is a flow chart explaining an iteration sequence in accordance with the invention for establishing the compensation parameters.

The object of the iteration is to establish the parameters for a compensated command function $y_{comp}$ (or driver function) in accordance with equation (3) such that the galvanometer mirror (sensor signal) effectively indicates a motion sequence in accordance with equation (1).

Referring now to FIG. 2, following the start of determining the compensation parameters starting values are firstly programmed (step S1). These starting values contain the desired amplitude or fundamental frequency values, starting values in estimating the amplitude/phase compensation factors, limiting values (S) representing a criterion for discontinuing iteration, and parameters for processing the sensor signal digitally. The latter comprise a number P of the points (scanning points) to be sensed per cycle, a scanning interval I related to P and the fundamental frequency, a number Z of cycles (lead cycles) to be entered into each sensor/actual signal sensing, and a number of cycles not to be taken into account in the transient phase.

With the amplitude/fundamental frequency values a non-compensated command function is computed for the line scan in accordance with equation (1) (step S2).

Subsequently a compensation command function is computed, for example in accordance with equation (3), using the starting estimate values for the amplitude/phase correction (step 3) and the galvanometer mirror is signalled with a corresponding driver signal (step 4). The sensor signal averaged over Z lead cycles (where Z may be 50, for example, the first cycles of which not being entered into averaging due to their transience) is to be compared to the non-compensated command function in accordance with equation (1) and the departure assessed. This is done by first making a Fourier analysis of the sensor signal (step S5) in which the first four Fourier components are computed. The second and fourth harmonics are checked to ensure that their amplitudes are substantially smaller or negligible relative to the fundamental and the third harmonic. The starting estimate values as the new compensation parameters are linearly adapted or corrected according to the Fourier components obtained.

If the measured amplitude value (sensor signal) corresponds to an amplitude higher or lower than the desired amplitude value of the command function, the amplitude compensation parameter needs to be corrected correspondingly to lower or higher values. By contrast, the phase compensation parameter is to be corrected until the measured shift in phase is negligible. The decision as to a further correcting step is made in checking a discontinuation criterion (step S8). This discontinuation criterion is satisfied when the absolute spacing between the measured amplitude value (sensor signal) and the desired amplitude value of the command function or the ratio of the last change in amplitude relative to the desired amplitude value or phase delay is below predetermined threshold values. The threshold value for the relatively amplitude spacing may be defined e.g.as 1 0/00 of the desired amplitude value. The threshold value for the phase delay may be e.g. in a range between 0° and 5°, preferably 1°.

If the discontinuation criterion is not satisfied a further iteration cycle occurs with corrected compensation parameters, it being good practice to compensate only approximately 80% of the measured departure in each step in iteration so that the stability of iteration is enhanced to advantage. When the discontinuation criterion is satisfied the compensation parameters are stored (step S9) and the procedure terminated.

In subsequent mirror signalling the command function is modified by the compensation parameters in accordance with equation (3) and the driver signal for the mirror engine set accordingly.

Figure 3A:
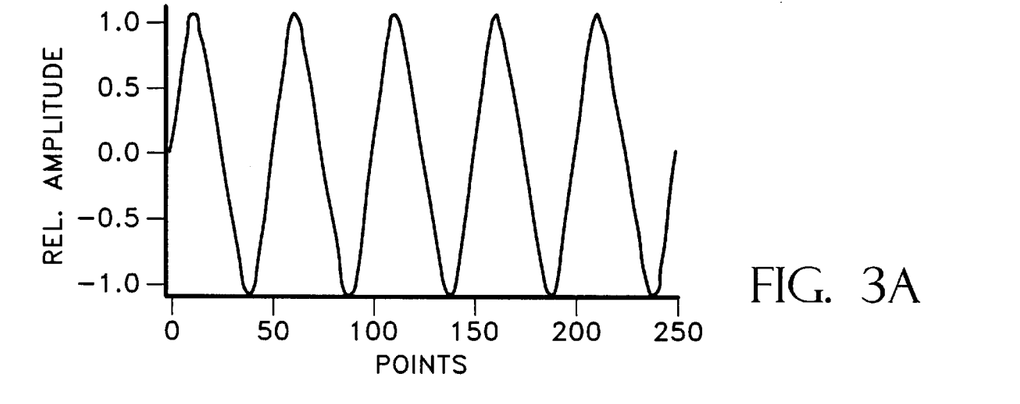
FIG. 3 are plots illustrating the compensated command function in accordance with the invention.
Figure 3B:
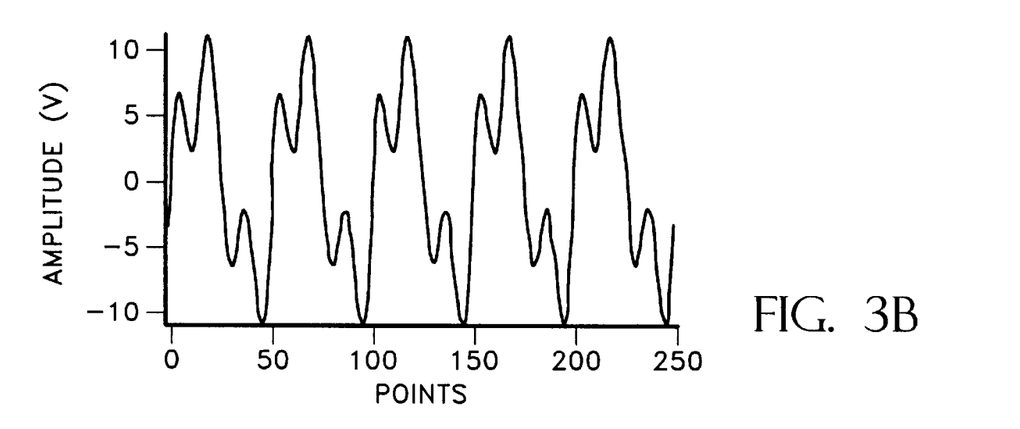
Figure 3C:
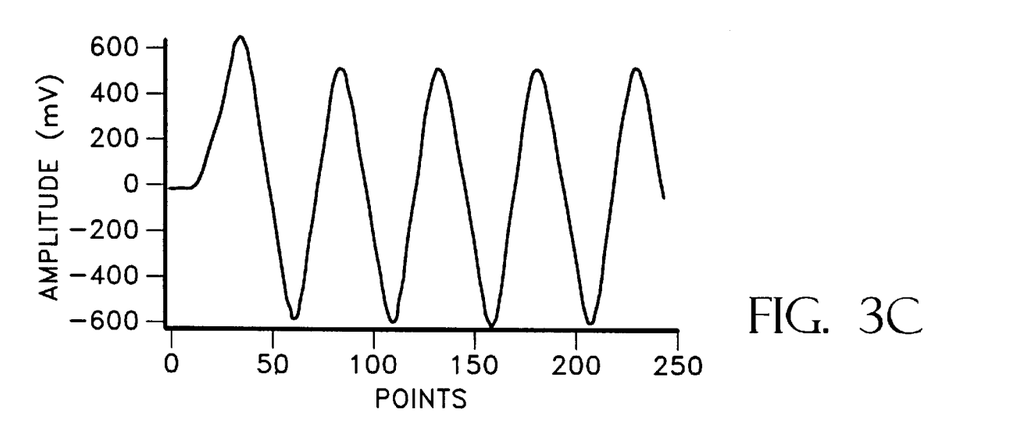

Referring now to FIG. 3 the example curve plots illustrate how the command function is compensated in accordance with the invention, wherein in each case the number of scanning points is entered as the time scale on the abscissae axis. Curve A represents a command function in accordance with equation (1), this being thus a motion sequence which the mirror is required to obey, for example, to optimally correspond to a linearization criterion in keeping with the first aspect of the invention as discussed at the outset. Curve B shows the command function modified (compensated) in accordance with the invention really used in the closed loop as the command function for the driver signal to obtain a sensor signal in accordance with curve C which due to the compensation substantially corresponds to the desired motion sequence in accordance with curve A. Curve C shows a departure from curve A merely in the transient phase where the conditions for computing with periodic functions have yet to be satisfied.

Figure 4:
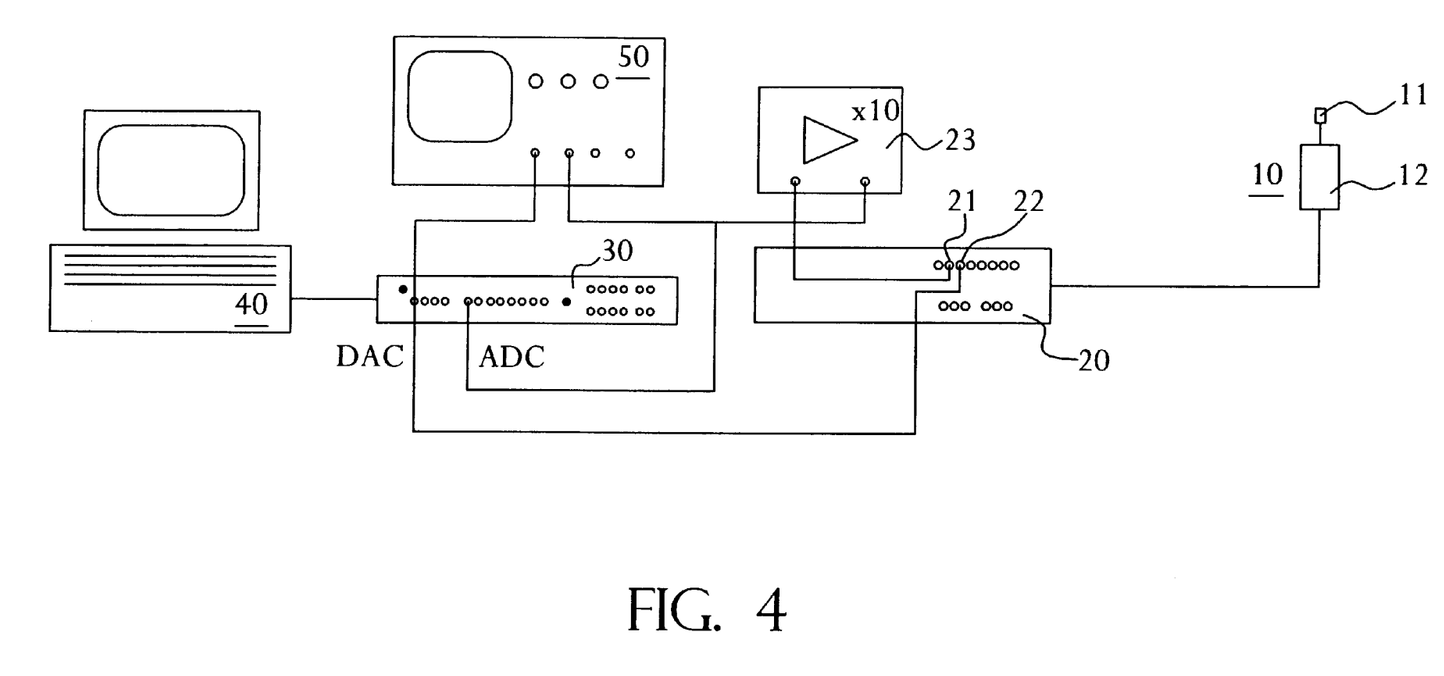
FIG. 4 is a block diagram of a closed loop arrangement in accordance with the invention.

Referring now to FIG. 4 there is illustrated a device for implementing determining the compensation parameters in accordance with the invention. The mirror arrangement 10 with a deflection mirror 11 and a galvanometer (incl. sensor) 12 is signalled by a closed loop control unit 20. The closed loop control unit 20 has a connection 21 for providing the sensor signal which after being amplified by the amplifier 23 is applied to the ADC input of a signal shaping and control circuit 30. The scanned sensor signal is furnished for further processing (steps S5 to S8, see above) to a computer unit 40 which provides the corrected command function in each case, furnished via the DAC output of the signal shaping and control circuit 30 to the closed-loop control unit 20 for forming a corrected driver signal. In addition a display means 50 (e.g. oscilloscope) is provided for monitoring the iteration procedure.

Figure 5:
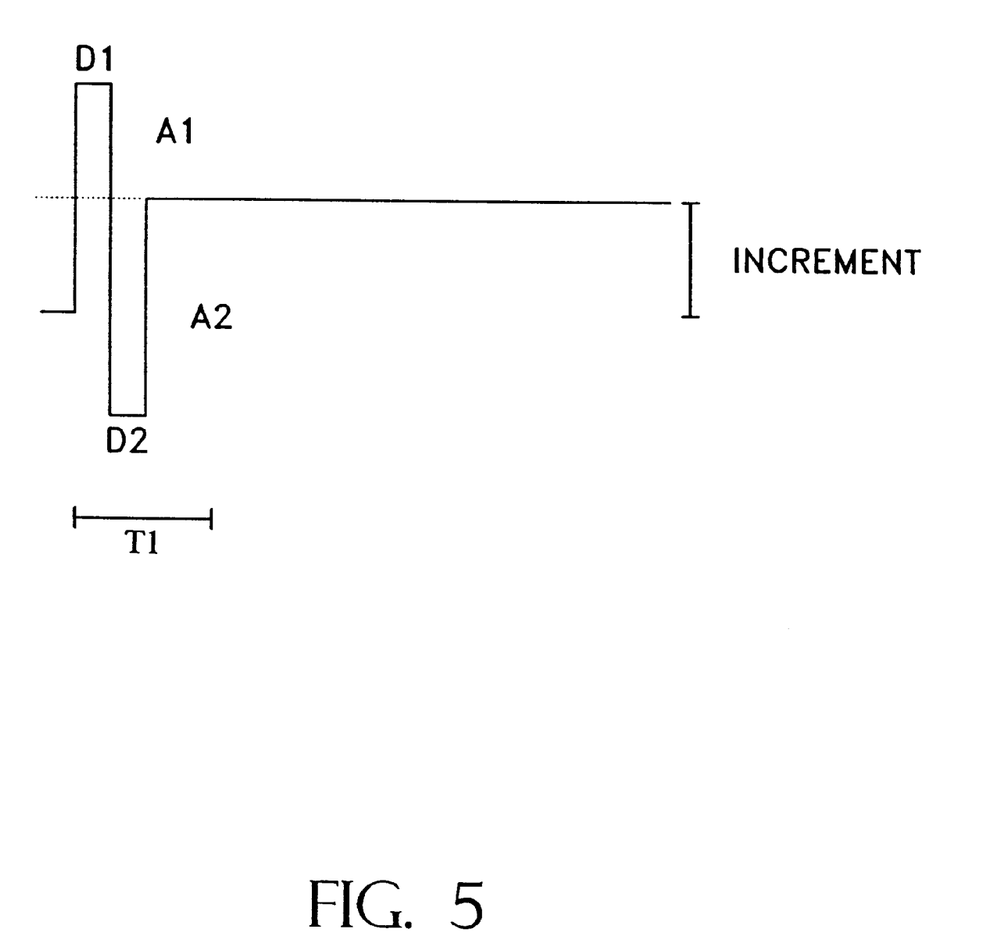
FIG. 5 is a diagram illustrating how the incremental setting movements are signalled.

Incremental, discrete setting movements make an alternative compensation possible as a modification of the procedure as discussed above with reference to FIG. 2. If a discrete setting of an object is intended, as in the case of a line changing mirror in the LSM, for example, this is done conventionally by a square wave incrementing function. Due to the inertia of the object, orienting, swivelling or the like thereof will not precisely obey the incrementing function, however, it instead exhibiting delay or overshoot phenomena. This is why instead of the square wave incrementing function a modified compensation incrementing function is employed as is illustrated in FIG. 5.

The compensation incrementing function is characterized by the amplitude relative to the setting amplitude corresponding to the desired incremental adjustment (increment)

is first increased for an overshoot time D1 by an overshoot value A1 and subsequently reduced for an undershoot time D2 by an undershoot value A2 before the setting amplitude is accepted. The four parameters A1, D1, A2 and D2 are selected as a function of the dynamic response of the object to be moved so that in the time range after an interval T1 the departure of the setting from the desired value is as small as possible. The sum of the overshoot time D1 and undershoot time D2 is thus smaller than the interval T1.

In an application for signalling the line change mirror in a LSM the interval T1 is selected so that on completion of T1 the next linear portion of the line scan follows.

The invention solves to advantage more particularly the problem as to how a laser beam for raster-type deflection e.g. with a galvanometer mirror at as high a repetition frequency as possible can be steered over an object or an angular range in a maximum portion of the working cycle as linearly as possible. Thus, for example, in the case of a commercially available galvanometer system AMP3 made by the LOBO Co. having a useable deflection range of 1.5° (optical angular range) a scanning frequency of 4,000 lines per second was achieved. This represents a substantial increase relative to the prior art comparison figure for feedback galvanometer mirrors of but 1,000 lines per second. If a larger deflection range is desired, then the fundamental frequency needs to be diminished. An optimal deflection over 15°, corresponding to the complete frame on a LSM was achieved with a fundamental frequency $f_0$=670 Hz, i.e. with 1,340 lines per second. For a fundamental frequency $f_0$=1 kHz (2000 lines per sec.) 60% of the frame was scanned.

Further advantages in application of the invention in a LSM materialize from the fact that with a working cycle of 75% the time needed for the measurement is made substantially better use of than in conventional systems without a linearization of data acquisition being necessary.

For two-dimensional scanning of a sample with the LSM at least two galvanometer mirrors are normally needed, one of which is set for line scanning and the other for line progressing (deflection perpendicular to line scanning of the first mirror). The above discussion related merely to the galvanometer mirror for line scanning. In the case of line progressing a fast motion sequence is not so critical, since roughly 12% of the working cycle is available for a minor incremental change. For a fast line sequence the invention (more particularly the frequency compensation) may also be made use of for controlling the line progressing, as a result of which incremental changes in times typically less than 100 µs are achievable.

It will be appreciared that although the invention was illustrated by way of the LSM as an example, other applications are, of course, feasible in which an object having an inert mass needs to be quickly moved periodically in accordance with a command function. This concerns e.g. moved scanning reflectors in general, e.g. in laser printers or in laser shows, but also as regards moved scanning signal sources or field-shaped elements (e.g. coils, electrodes) or the like.

It will further be appreciated that the principles of amplitude/phase compensation discussed with reference to FIGS. 2 and 3 are not restricted to means of controlling motion but may also be employed in any kind of feedback circuit.

What is claimed is:

1. A method for periodically moving an object so that a location coordinate of the object corresponds to an aim function being a function of time (t) at least in one periodic sub-interval of each cycle, comprising the step of driving the object so that a location of the object changes in response to a command function, wherein said command function is represented as $$y(t) = \sum_i^n a_i \cdot A_i(t),$$

wherein $a_i$ comprise a finite number of n command parameters and $A_i$ comprise a finite number of series expansion functions, said command function being derivable by parameterizing the aim function as a series expansion which is represented as $$y'(t) = \sum_i^\infty a'_i \cdot A_i(t),$$

wherein $a'_i$ comprise parameters of said series expansion and $A_i$ comprise corresponding series expansion functions, and determining n command parameters for which an optimization criterion is satisfied in the periodic sub-interval for the command function.

2. The method as set forth in claim 1 wherein said series expansion is a Fourier expansion.

3. The method as set forth in claim 1 wherein said optimization criterion is satisfied when in said periodic sub-interval the sum of the square departures between said command function and said aim function is a minimum.

4. The method as set forth in claim 1 wherein said optimization criterion is satisfied when the second time derivative of said command function is a minimum in said periodic sub-interval.

5. The method as set forth in claim 1 wherein the number of frequency components entered into said series expansion is selected as a function of a frequency characteristic of said object.

6. The method as set forth in claim 1 wherein said aim function is an even linear function and said command function has the form $$y(t)=A(a_1 \cdot \sin(f_0 t)+a_3 \cdot \sin(3f_0 t))$$

wherein A, $a_1$ and $a_3$ are free parameters and $f_0$ is a fundamental frequency of movement of said object.

7. The method as set forth in claim 1 wherein said aim function is an uneven linear function and said command function has the form $$y(t)=A(a_1 \cdot \sin(f_0 t)+a_2 \cdot \sin(2f_0 t)+a_3 \cdot \sin(3f_0 t))$$

wherein A, $a_1$, $a_2$ and $a_3$ are free parameters and $f_0$ is a fundamental frequency of movement of said object.

8. The method as set forth in claim 1 wherein said moved object is a scanning mirror in a laser scanning microscope having a galvanometer mirror arrangement, signalled in accordance with said command function.

9. A method for setting a periodically varying controlled variable by a driving means in accordance with a command function y(t) of the form $$y(t) = C \cdot \left[\overset{n}{\underset{k}{\mathrm{å}}}\right] \sum_{k}^{n} A_k \cdot \sin(kf_0 t)$$

where said controlled variable comprises a reduction in amplitude and a phase delay relative to a driver function wherein said driver function is formed in accordance with $$y_{comp}(t) = C \cdot \left[\sum_{k}^{n}\right] \sum_{k}^{n} (A_k / a_k(f_0)) \cdot \sin(kf_0 t - \phi(f_0)),$$

where C and k are free parameters, $A_k$ are parameters of said command function, and $a_k(f_0)$ and $\phi(f_0)$ are frequency-dependent amplitude/phase compensation parameters, respectively.

10. The method as set forth in claim 9 wherein said controlled variable is a location coordinate of an object to be moved periodically, and the driving means for driving said object is controlled in accordance with said driver function.

11. The method as set forth in claim 10 wherein said command function is represented as $$y(t) = \sum_{i}^{n} [\sum] a_i \cdot A_i(t),$$

wherein $a_i$ comprise a finite number of n command parameters and $A_i$ comprise a finite number of series expansion functions, said command function being derivable by parameterizing the aim function, being a function of time(t), as a series expansion which is represented as $$y'(t) = \sum_{i}^{n} [\sum] a'_i \cdot A_i(t),$$

wherein $a'_i$ comprise parameters of said series expansion and $A_i$ comprise corresponding series expansion functions, and determining n command parameters for which an optimization criterion is satisfied in the periodic sub-interval for the command function.

12. The method as set forth in claim 9 wherein said amplitude/phase compensation parameters are sensed from an amplitude/phase frequency characteristic of said driving means.

13. The method as set forth in claim 9 wherein said driving means is part of a closed loop containing a sensor means, analog amplifier means and signal shaping means for forming said driver function, and said amplitude/phase compensation parameters are sensed by an iterative method, in which following a definition of estimate values for said amplitude/phase compensation parameters said driving means is repeatedly signaled for a predetermined number of lead cycles in accordance with a estimated or corrected driver function, a sensor signal of said sensor means being compared during said lead cycles to said command function and said estimate values corrected until said sensor signal corresponds to said command function.

14. The method as set forth in claim 13 wherein for comparing said sensor signal and said command function said sensor signal is subjected to a Fourier analysis and the Fourier components are adapted to said parameters of said command function.

* * * * *